(12) United States Patent
Sasges et al.

(10) Patent No.: US 6,512,234 B1
(45) Date of Patent: Jan. 28, 2003

(54) OPTICAL RADIATION SENSOR DEVICE

(75) Inventors: Michael Sasges, London (CA); Peter C. Vandoodeward, Lambeth (CA)

(73) Assignee: Trojan Technologies, Inc. (CA)

(*) Notice: Subject to any disclaimer, the term of this patent is extended or adjusted under 35 U.S.C. 154(b) by 0 days.

(21) Appl. No.: 09/736,241

(22) Filed: Dec. 15, 2000

Related U.S. Application Data

(60) Provisional application No. 60/172,160, filed on Dec. 17, 1999.

(51) Int. Cl.⁷ .............................................. G01N 21/59
(52) U.S. Cl. ...................................................... 250/373
(58) Field of Search ........................ 356/434; 250/347, 250/373; 359/214

(56) References Cited

U.S. PATENT DOCUMENTS

| | | | | |
|---|---|---|---|---|
| 3,977,793 A | * | 8/1976 | Trotta ........................... | 250/347 |
| 4,103,167 A | * | 7/1978 | Ellner ..................... | 250/432 R |
| 4,436,260 A | * | 3/1984 | Donelan ..................... | 244/3.16 |
| 4,482,809 A | | 11/1984 | Maarschalkerweerd ..... | 250/436 |
| 4,707,605 A | * | 11/1987 | Astheimer et al. .......... | 250/340 |
| 4,872,980 A | | 10/1989 | Maarschalkerweerd ..... | 210/243 |
| 5,004,922 A | * | 4/1991 | Edwards ..................... | 250/340 |
| 5,006,244 A | | 4/1991 | Maarschalkerweerd ..... | 210/243 |
| 5,418,370 A | | 5/1995 | Maarschalkerweerd ..... | 250/431 |
| 5,452,135 A | | 9/1995 | Maki et al. .................. | 359/834 |
| 5,468,963 A | * | 11/1995 | Bishop ..................... | 250/203.3 |
| 5,539,210 A | | 7/1996 | Maarschalkerweerd ..... | 250/372 |
| RE36,896 E | | 10/2000 | Maarschalkerweerd .. | 422/186.3 |

FOREIGN PATENT DOCUMENTS

| | | | | |
|---|---|---|---|---|
| DE | 297 07 052 U1 | 12/1997 | ............ | B01J/19/12 |
| EP | 0584389 A1 | * 3/1994 | .......... | G01N/21/33 |

* cited by examiner

*Primary Examiner*—Constantine Hannaher
(74) *Attorney, Agent, or Firm*—Katten Muchin Zavis Rosenman

(57) ABSTRACT

An optical radiation sensor device includes a radiation collector for receiving radiation from a predefined arc around the collector within the field and redirecting the received radiation along a predefined pathway; motive means to move the radiation collector from a first position in which a first portion of the predefined arc is received by the radiation collector and a second position in which a second portion of the predefined arc is received by the radiation collector; and a sensor element capable of detecting and responding to incident radiation along the pathway when the radiation collector is in the first position and in the second. The use of the optical radiation sensor device in a radiation source module and in a fluid treatment system is also described.

35 Claims, 6 Drawing Sheets

OPTICAL RADIATION SENSOR DEVICE

BACKGROUND OF THE INVENTION

1. Field of the Invention

Generally, the present invention relates to an optical radiation sensor system.

2. Description of the Prior Art

Optical radiation sensors are known and find widespread use in a number of applications. One of the principal applications of optical radiation sensors is in the field of ultraviolet radiation fluid disinfection systems.

It is known that the irradiation of water with ultraviolet light will disinfect the water by inactivation of microorganisms in the water, provided the irradiance and exposure duration are above a minimum "dose" level (often measured in units of microwatt seconds per square centimetre). Ultraviolet water disinfection units such as those commercially available from Trojan Technologies Inc. under the tradenames UV700 and UV8000, employ this principle to disinfect water for human consumption. Generally, water to be disinfected passes through a pressurized stainless steel cylinder which is flooded with ultraviolet radiation. Large scale municipal waste water treatment equipment such as that commercially available from Trojan Technologies Inc. under the trade-names UV3000 and UV4000, employ the same principle to disinfect waste water. Generally, the practical applications of these treatment systems relates to submersion of treatment module or system in an open channel wherein the wastewater is exposed to radiation as it flows past the lamps. For further discussion of fluid disinfection systems employing ultraviolet radiation, see any one of the following:

U.S. Pat. No. 4,482,809,
U.S. Pat. No. 4,872,980,
U.S. Pat. No. 5,006,244,
U.S. Pat. No. 5,418,370,
U.S. Pat. No. 5,539,210, and
U.S. Pat. No. 5,590,390 (U.S. Pat. No. Re. 36,896).

In many applications, it is desirable to monitor the level of ultraviolet radiation present within the water under treatment. In this way, it is possible to assess, on a continuous or semi-continuous basis, the level of ultraviolet radiation, and thus the overall effectiveness and efficiency of the disinfection process. The information so-obtained may be used to control lamp output to a desired level.

It is known in the art to monitor the ultraviolet radiation level by deploying one or more sensor devices near the operating lamps in specific locations and orientations which are remote from the operating lamps. These sensor devices may be photodiodes, photoresistors or other devices that respond to the impingement of the particular radiation wavelength or range of radiation wavelengths of interest by producing a repeatable signal level (e.g., in volts or amperes) on output leads.

Conventional optical radiation sensors, by design or orientation, normally sense the output of only one lamp, typically one lamp which is adjacent to the sensor. If it is desirable to sense the radiation output of a number of lamps, it is possible to use an optical radiation sensor for each lamp. A problem with this approach is that the use of multiple sensors introduces uncertainties since there can be no assurance that the sensors are identical. Specifically, vagaries in sensor materials can lead to vagaries in the signals which are sent by the sensors leading to a potential for false information being conveyed to the user of the system.

Another problem with the prior art approach is that it is not possible to ascertain the lamp output of a single lamp in an array of lamps which operate within the field of view of a single sensor.

A further problem with prior art is that, if the U.V. transmittance of the fluid being treated was unknown, two sensors would be required to determine the dose delivered to the fluid—i.e., one sensor to measure lamp intensity and one sensor to measure U.V. transmittance.

Accordingly, it would be desirable to have a radiation source module comprising an optical sensor which could be used to detect and convey information about radiation from a number of radiation sources thereby obviating the need to use multiple optical radiation sensors. Further, it would be advantageous to have an optical radiation sensor device capable of detecting the lamp output of a single lamp in a lamp array.

SUMMARY OF THE INVENTION

It is an object of the present invention to provide a novel radiation source module which obviates or mitigates at least one oft he above-mentioned disadvantages of the prior art.

It is another object of the present invention to provide a novel radiation source assembly which obviates or mitigates at least one of the above-mentioned disadvantages of the prior art.

Accordingly, in one of its aspects, the present invention provides an optical radiation sensor device for detecting radiation in a radiation field, the device comprising:

a radiation collector for receiving radiation from a predefined arc around the collector within the radiation field;

motive means to move the radiation collector from a first position in which a first portion of the predefined arc is received by the radiation collector and a second position in which a second portion of the predefined arc is received by the radiation collector; and a sensor element capable of detecting and responding to incident radiation received from the radiation collector when the radiation collector is in the first position and in the second position.

In another of its aspects, the present invention provides a radiation source module comprising a frame having a first support member; at least one radiation source assembly extending from and in engagement with a first support member, the at least one radiation source assembly comprising at least one radiation source and a radiation sensor device for detecting radiation in a radiation field, the sensor device comprising: a radiation collector for receiving radiation from a predefined arc around the collector within the radiation field; motive means to move the radiation collector from a first position in which a first portion of the predefined arc is received by the radiation collector and a second position in which a second portion of the predefined arc is received by the radiation collector; and a sensor element capable of detecting and responding to incident radiation received from the radiation collector when the radiation collector is in the first position and in the second position.

In another of its aspects, the present invention provides a method for measuring transmittance of a fluid being exposed to a radiation field having disposed therein an optical radiation sensor device, the device comprising: a radiation collector for receiving radiation from a predefined arc around the collector within the radiation field; the radiation collector being movable from a first position in which a first portion of the predefined arc is received by the radiation collector and a second position in which a second portion of the predefined arc is received by the radiation collector; and a sensor element capable of detecting and responding to incident radiation received from the radiation collector when the radiation collector is in the first position and in the second position, the method comprising the steps of:

(i) determining a first radiation intensity at the first position of the radiation collector;

(ii) producing a first output from the sensor element which correlates to the first radiation intensity;

(iii) moving the radiation collector to the second position;

(iv) determining a second radiation intensity at the second position of the radiation collector;

(v) producing a second output from the sensor element which correlates to the second radiation intensity; and (vi) calculating the transmittance of the fluid from the first output and the second output.

Thus, the present inventors have discovered an optical radiation sensor system which allows determination of lamp output information for a single lamp in an array of lamps. An additional advantage of the present invention is that a single sensor device can be used to determine the dose delivered to the fluid (i.e., in place of the multiple sensors conventionally required as discussed above). More specifically, the present optical radiation sensor allows on-line determination of U.V. transmittance of the fluid being treated in a U.V. radiation lamp array. Yet another advantage of the present invention is that it allows for determination of reflected radiation from the walls of the reactor. Yet another advantage of the present invention it can be used to identify which radiation source in an array of radiation sources is malfunctioning or is inoperable. Other advantages will become apparent to those of skill in the art.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
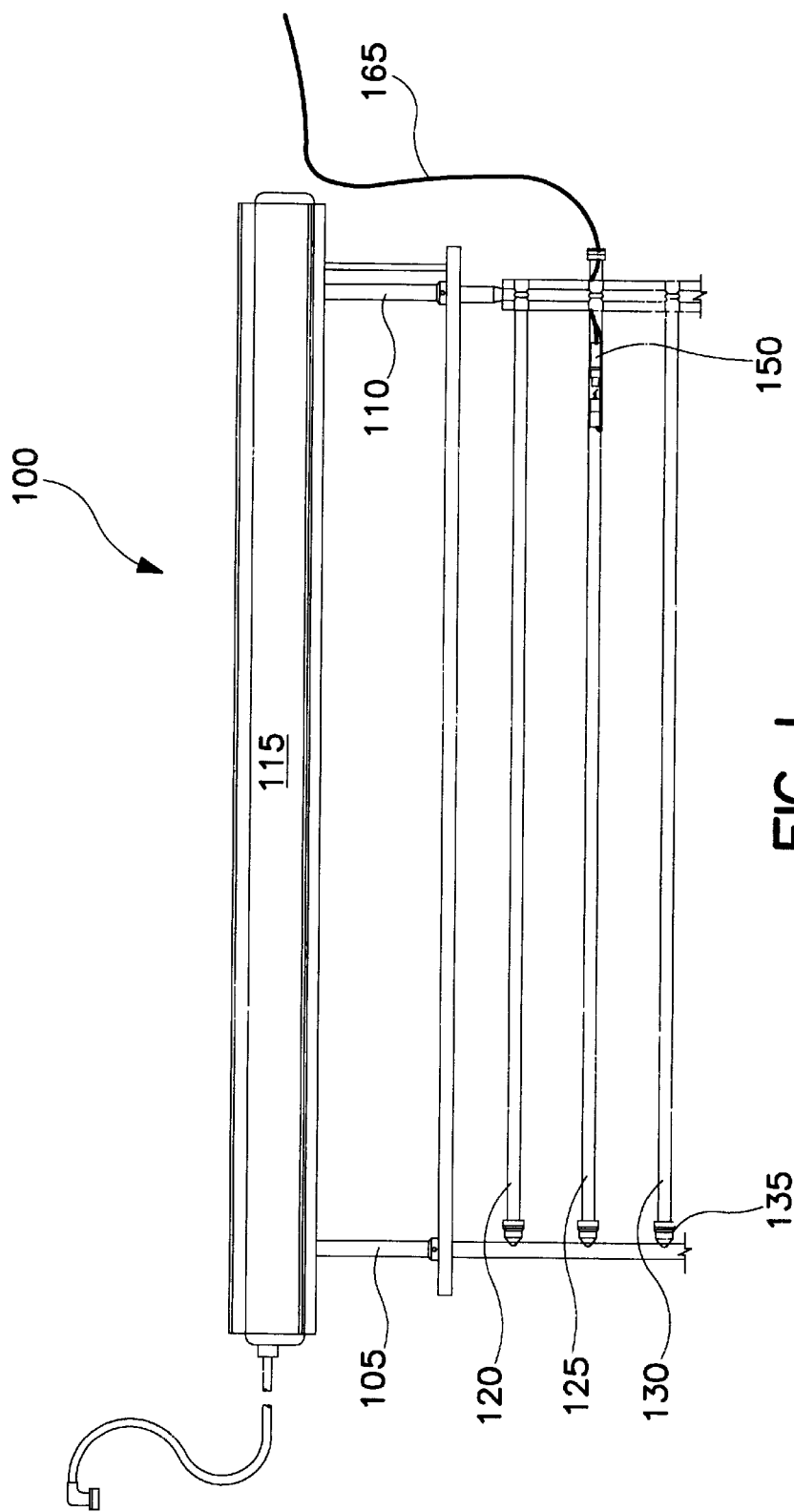
FIG. 1 is a side elevation of an embodiment of the present radiation source module.
Figure 2:
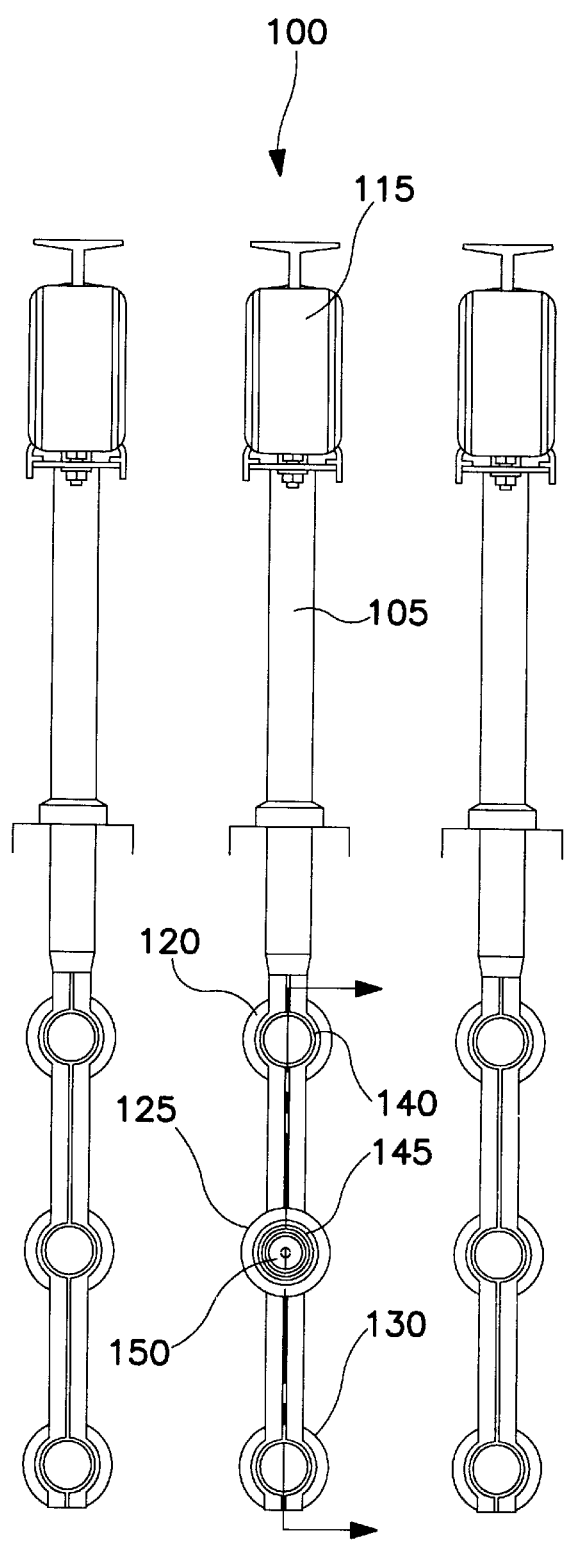
FIG. 2 is a sectional view of a trio of radiation source modules including the radiation source module illustrated in FIG. 1.

With reference to FIGS. 1–2, a radiation source module 100 is illustrated. Radiation source module 100 comprises a pair of support legs 105,110 depending from a crosspiece 115. Disposed between support legs 105,110 are a trio of radiation source assemblies 120,125,130. Each radiation source assembly 120,125,130 comprises a radiation source 140 (e.g., an ultraviolet emitting lamp) disposed within a protective sleeve 145 (e.g., typically made of quartz). The design of support legs 105,110 and radiation source assemblies 120 is preferably as is described in U.S. Pat. Nos. 4,872,980 and 5,006,244 referred to hereinabove.

Preferably, each protective sleeve 145 is connected to support leg 105 via a coupling nut 135. The details of this connection are preferably as set out in copending U.S. patent application Ser. No. 09/258,142 (Traubenberg et al.).

Figure 3:
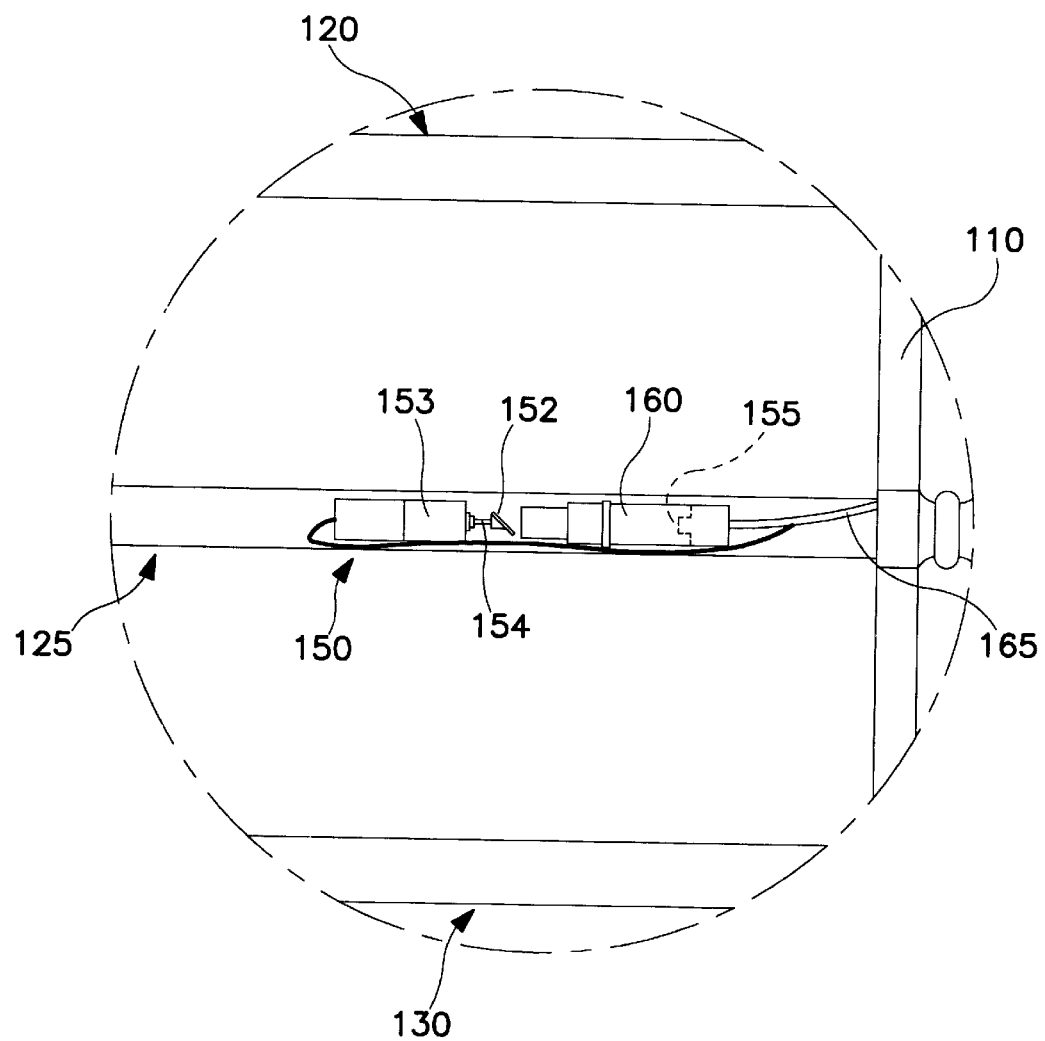
FIG. 3 illustrates an enlarged sectional view taken along line A—A in FIG. 2.

With reference to FIGS. 2 and 3, radiation source assembly 125 comprises an optical radiation sensor 150 disposed within protective sleeve 145 adjacent to support leg 110. Optical sensor 150 comprises an inclined mirror 152 attached to an electric motor 153 via an axle 154.

Optical sensor 150 further comprises a body 160 which contains a photodiode 155 or other radiation sensor material as described above. The sensor itself may be chosen from conventional sensors. For example, a suitable sensor is commercially available from UDT Sensors Inc. (Hawthorne,. Calif.).

Figure 4:
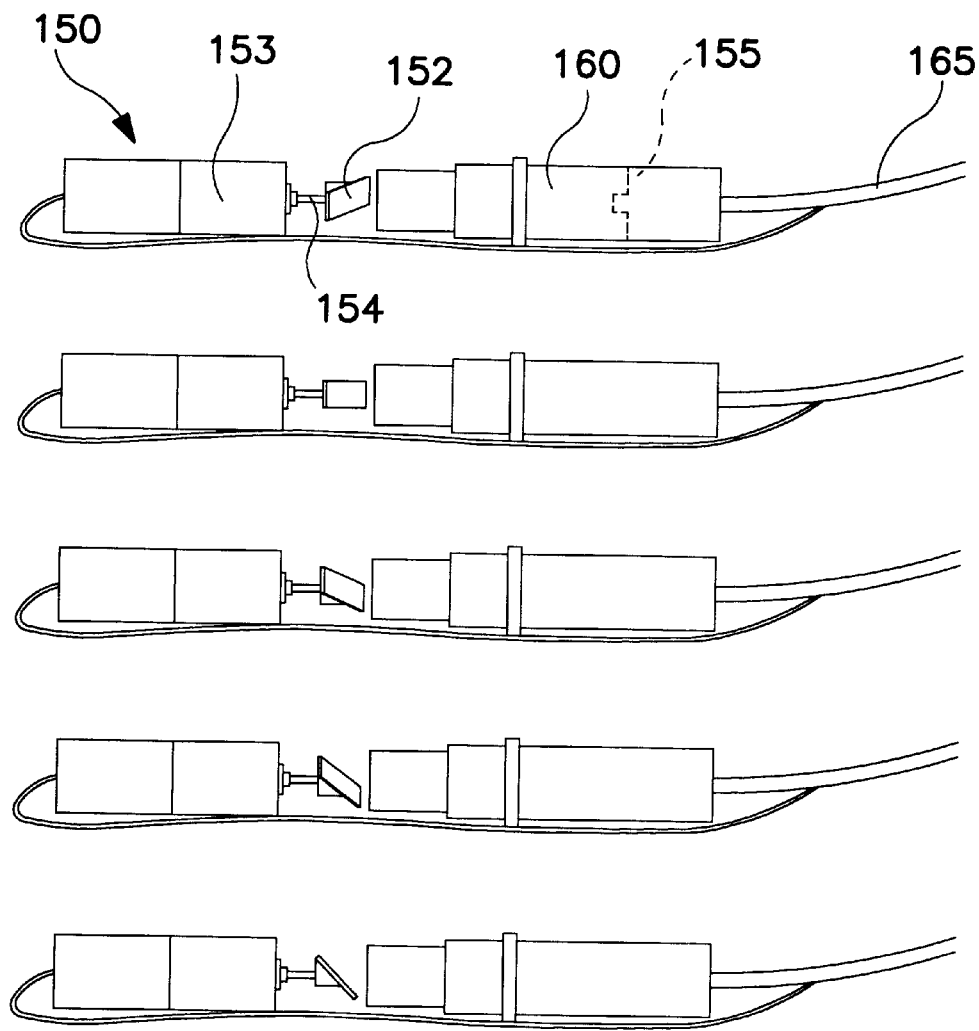
FIG. 4 illustrates an enlarged view of a first embodiment of the present optical sensor in use.

With reference to FIGS. 3 and 4, operation of optical sensor 150 will be described. Generally, radiation from the field around optical sensor 150 will impinge on mirror 152 and be redirected along a pathway substantially parallel to a longitudinal axis of radiation source assembly 125 whereupon it will impinge photodiode 155. A signal related to the amount of radiation sensed is then sent from body 160 through a lead 165 which is connected to a conventional control system allowing the user to ascertain the level of radiation sensed compared to a predetermined benchmark. This may allow the user to have enhanced control of the UV treatment system. For example, in response to ascertaining the level of radiation sensed, the user may wish to vary the lamp power level to achieve a given dose or intensity.

In the embodiment illustrated in FIGS. 3 and 4, it is possible to sweep a 360° arc around radiation sensor 150 with mirror 152 thereby obtaining a number of lamp output readings for an array of lamps around optical radiation sensor 150—see specifically FIG. 4. Using conventional calculations (Beer's law), it is possible to obtain a series of lamp output readings thereby generating a "snapshot" of the area around optical radiation sensor 150. For example, in the nine lamp array illustrated in FIG. 2, by placing optical radiation sensor 150 in the middle of the array and sweeping mirror 152 in a 360° arc, it is possible to take multiple lamp output readings at known positions of mirror 152 and identify which of the eight lamps surrounding radiation source assembly 125 is malfunctioning or is inoperable. Further, it is possible to quantify lamp output intensity.

Mirror 152 can be continuously rotated and radiation readings taken at preset intervals to provide on-line transmittance analysis of fluid being treated by the output of the lamp array. This is a significant advantage of the present optical radiation sensor device. On-line transmittance analysis may be achieved as follows.

Consider two lamps, each a unique distance from a rotating sensor. The lamps are identical with an intensity at their surface of $I_o$. Lamp 1 has a fluid thickness x between its surface and the sensor. Lamp 2 has a fluid thickness y between its surface and the sensor. These distances are known and are set by the design of the disinfection system.

The sensor optics may be designed to accept radiation from a single known plane, which means that all light reaching the sensor from a single lamp has travelled substantially the same distance. It is known that for a sensor with a limited field of view and an extended line source, the intensity, I, in a non-absorbing, non-scattering medium is proportional to the inverse of the distance, d from source to detector:

It is also known that an absorbing medium causes intensity to drop off exponentially according to the Beer-Lambert law:

$$I = I_o/e^{-kd}$$

where k is the fluid absorbance with units of I/distance and d is the distance the radiation has traveled through the medium.

The intensity at the sensor arriving from lamp is therefore given by the following equation:

$$I = \frac{I_o}{d}e^{-kd}.$$

The sensor may, for convenience, be designed to produce an output directly proportional to this intensity. The ratio of the sensor output, O, when pointed at lamp 1 to that when pointed at lamp 2 is thus given by $$\frac{O_1}{O_2} = \frac{y}{x}e^{-k(x-y)}.$$

The outputs are produced by the sensor, and the distances x and y are known. thus the material property absorbance, k, may be directly determined from the two measurements and this equation.

Those of skill in the art will also recognize that the Beer-Lambert law may also be written in terms of logarithms in base 10, or directly in terms of transmittance. The general principle behind determining the absorbance or transmittance is the same as described above.

The accuracy oft his system can be improved by incorporating multiple lamps at multiple distances, or by using several lamps at one distance and several lamps at another distance and averaging. These techniques help to overcome errors caused by variations between individual lamps, and errors caused by slight inaccuracies in lamp positions.

Those skilled in the art will recognize that, for clarity, various simplifications have been made to facilitate clear presentation of the concepts above. Standard modeling and more sophisticated calculation can be used to account for deviations from the ideal described above.

Figure 5:
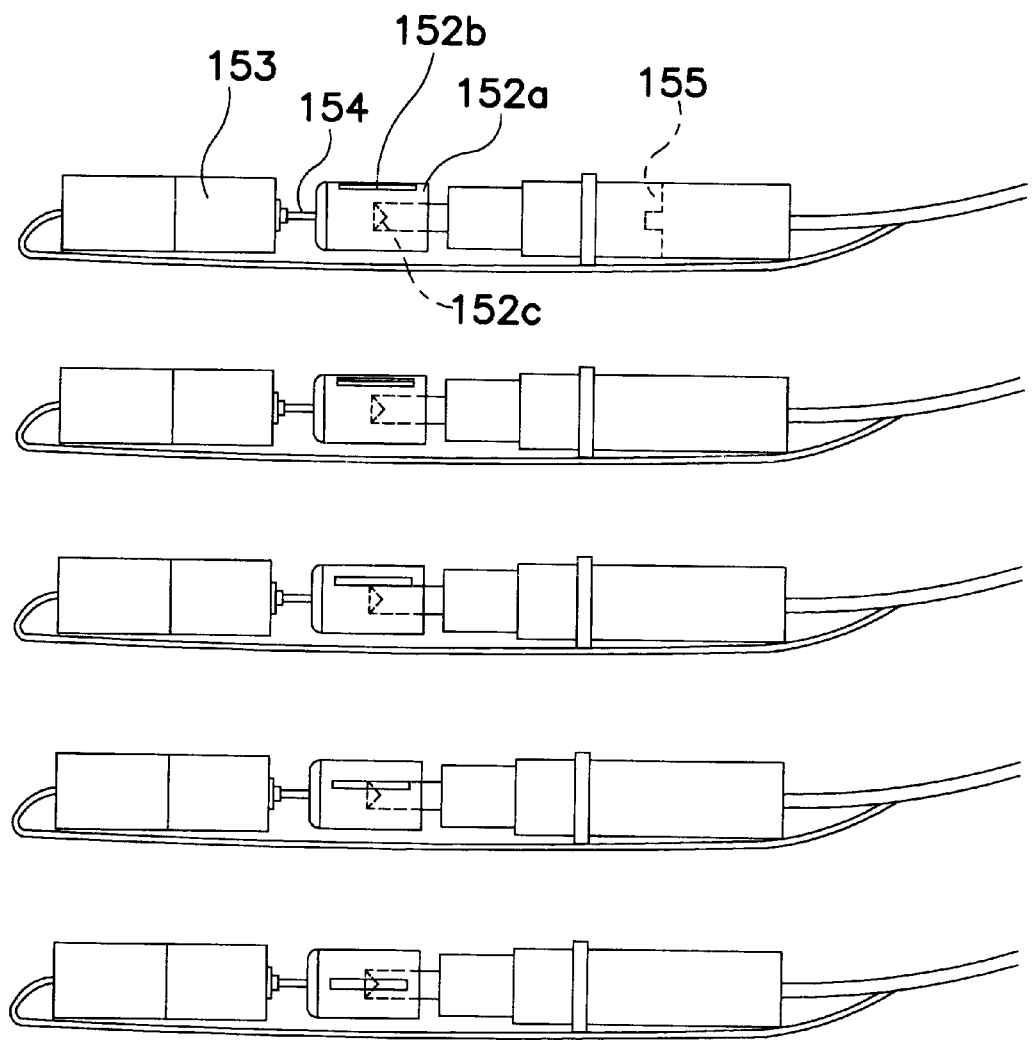
FIG. 5 illustrates an enlarged view of a second embodiment of the present optical sensor in use.

FIG. 5 illustrates an alternate embodiment of the present optical radiation sensor device. Specifically, as shown, instead of a rotating mirror as illustrated in FIGS. 3 and 4, the embodiment in FIG. 5 utilizes a rotating housing 152*a* comprising a window 152*b* which allows a portion of the radiation to pass therethrough. The portion of radiation which passes through window 152*b* impinges on a concave surface 152*c* in a radiation collector as described in copending International patent application S.N. PCT/CA00/01002 filed on Sep. 1, 2000, entitled OPTICAL RADIATION SENSOR DEVICE AND USE IN A RADIATION SOURCE MODULE [Sasges et al]. Other of the radiation collectors described in Sasges et al. may also be used.

Figure 6:
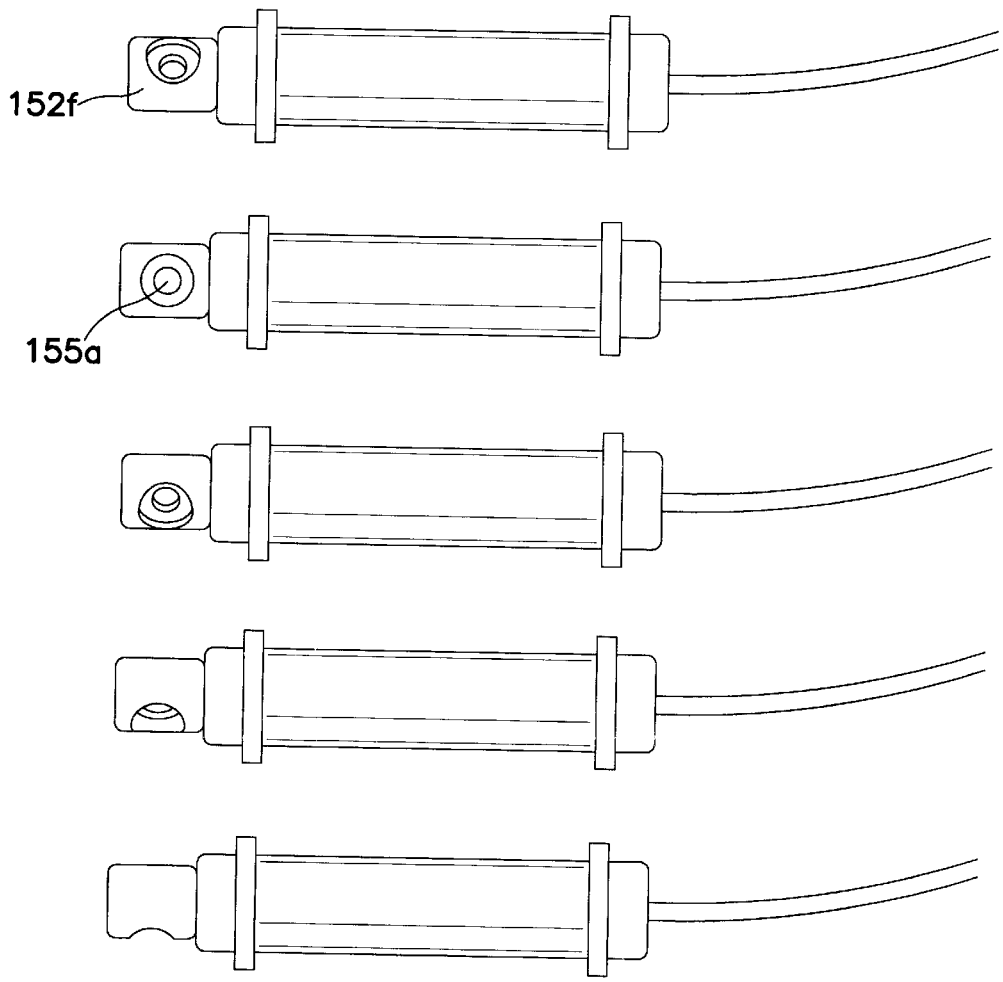
FIG. 6 illustrates an enlarged view of a third embodiment of the present optical sensor in use.

FIG. 6 illustrates yet an alternate embodiment of the present optical radiation sensor device. Specifically, as shown, instead of a rotating mirror as illustrated in FIGS. 3 and 4, the embodiment in FIG. 6 utilizes a rotating housing 152*f* comprising integrally disposed therein a sensor 155*a*. Thus, in this embodiment, the collector housing and sensor are moved as a unit.

As shown in FIG. 2, radiation source module 100 may be a member of an array of radiation source modules which do not contain an optical radiation source sensor. Thus, the trio of radiation source modules illustrated in FIG. 2 could be placed in an open channel as shown in U.S. Pat. Nos. 4,872,980 and 5,006,244 and used to treat wastewater as set out in those patents.

While the present invention has been described with reference to preferred and specifically illustrated embodiments, it will of course be understood by those skilled in the arts that various modifications to these preferred and illustrated embodiments may be made without the departing from the spirit and scope of the invention. For example, while the present invention has been illustrated with reference to radiation source modules similar in general design to those taught in U.S. Pat. Nos. 4,872,980 and 5,006,244, it is possible to employ the present radiation source assembly in a module such as the one illustrated in U.S. Pat. Nos. 5,418,370, 5,539,210 and 5,590,390 (Re.36, 896)—i.e., in a module having a single support for one or more elongate source assemblies extending therefrom. Further, it is further it is possible to employ the present radiation source assembly in a module such as the one illustrated in copending U.S. patent application Ser. No. 09/493,226, filed on Jan. 28, 2000 [Alexander et al.]. Still further, it is possible to employ the present radiation source assembly in a fluid treatment device such as those commercially available from Trojan Technologies Inc. under the tradenames UV700 and UV8000. Still, further, while, in the embodiments illustrated and described above, the optical sensor is disposed at the end of the protective sleeve opposite the end where electrical connections for the lamp are located, it is possible to locate the optical radiation sensor at the same end as the electrical connections for the lamp thereby allowing for use of the protective sleeve having one closed end. Still further, it is possible to utilize an optical radiation source sensor disposed between two radiation sources, all of which are disposed within a protective sleeve. Still further, it is possible to have a protective sleeve with a dedicated optical radiation sensor device of the present invention (i.e., there would be no radiation source disposed in the protective sleeve containing the optical radiation sensor device). Other modifications which do not depart from the spirit and scope of the present invention will be apparent to those skilled in the art.

All publications, patents and patent applications referred to herein are incorporated by reference in their entirety to the same extent as if each individual publication, patent or patent application was specifically and individually indicated to be incorporated by reference in its entirety.

What is claimed is:

1. An optical radiation sensor device for detecting radiation in a radiation field inside a water treatment system, the device comprising:

a radiation collector configured to be coupled to water treatment system structure, for receiving radiation from a predefined arc around the collector within the radiation field within the water treatment system;

motive means to move the radiation collector from a first position in which radiation from a first portion of the predefined arc within the water treatment system is received by the radiation collector and a second position in which radiation from a second portion of the predefined arc within the water treatment system is received by the radiation collector; and a sensor element configured to be coupled to water treatment system structure, for detecting and responding to incident radiation received from the radiation collector when the radiation collector is in the first position and in the second position.

2. The optical sensor device defined in claim 1, wherein the predefined arc comprises a substantially 360° arc.

3. The optical sensor device defined in claim 1, wherein the predefined arc comprises at least one arc less than 360°.

4. The optical sensor device defined in claim 1, wherein the predefined arc comprises two or more independent arcs less than 360°.

5. The optical sensor device defined in claim 1, wherein the radiation collector is connected to the motive means and is movable with respect to the sensor element.

6. The optical sensor device defined in claim 5, wherein the radiation collector comprises a mirror oriented to redirect received radiation along a predefined pathway to the sensor element.

7. The optical sensor device defined in claim 6, wherein the mirror comprises a reflective face which is inclined.

8. The optical sensor device defined in claim 6, wherein the mirror is rotatable about an axis substantially parallel to the predefined pathway.

9. The optical sensor device defined in claim 5, wherein the radiation collector comprises a movable window for receiving the first portion of radiation from the predefined arc and a reflector for redirecting the first portion radiation from of the predefined arc along a predefined pathway to the sensor element.

10. The optical sensor device defined in claim 9, wherein the reflector is fixed with respect to movement of the window.

11. The optical sensor device defined in claim 9, wherein the reflector is movable with respect to the window.

12. The optical sensor device defined in claim 9, wherein the reflector comprises a distal surface having a generally concave shape and further comprises a reflective surface to reflect the radiation from the window along the predefined pathway.

13. The optical sensor device defined in claim 9, wherein the radiation collector comprises a distal surface having a generally convex shape which refracts and reflects the incident radiation along the pathway.

14. The optical sensor device defined in claim 1, wherein the radiation collector and the sensor element are comprised in a integral unit which is rotatably moveable by the motive means.

15. The optical sensor device defined in claim 1, wherein the motive means moves the radiation collector in a step-wise manner from the first position to the second position.

16. The optical sensor device defined in claim 1, wherein the motive means moves the radiation collector in a continuous manner between the first position and the second position.

17. A fluid treatment system comprising an array of radiation sources for generating a field of radiation, the array of radiation sources further comprising a radiation sensor device as defined in claim 1.

18. A radiation source module inside a water treatment system, comprising:
   a frame having a first support member configured to be coupled to water treatment system structure; and
   at least one radiation source assembly extending from and in engagement with the first support member, the at least one radiation source assembly comprising at least one radiation source and a radiation sensor device for detecting radiation in a radiation field inside the water treatment system, the sensor device comprising:
      a radiation collector for receiving radiation from a predefined arc around the collector within the radiation field within the water treatment system;
      motive means to move the radiation collector from a first position in which a first portion of radiation from the predefined arc is received by the radiation collector to a second position in which a second portion of radiation from the predefined arc is received by the radiation collector within the water treatment system; and
      a sensor element capable of detecting and responding to incident radiation received from the radiation collector when the radiation collector is in the first position and in the second position.

19. The radiation source module defined in claim 18, wherein the predefined arc comprises a substantially 360° arc.

20. The radiation source module defined in claim 18, wherein the predefined arc comprises at least one arc less than 360°.

21. The radiation source module defined in claim 18, wherein the predefined arc comprises two or more independent arcs less than 360°.

22. The radiation source module defined in claim 18, wherein the at least one radiation source is disposed within a protective sleeve.

23. The radiation source module defined in claim 18, wherein the radiation collector is connected to the motive means and is movable with respect to the sensor element.

24. The radiation source module defined in claim 21, wherein the radiation collector comprises a mirror oriented to redirect received radiation along a predefined pathway to the sensor element.

25. The radiation source module defined in claim 24, wherein the mirror comprises a reflective face which is inclined.

26. The radiation source module defined in claim 24, wherein the mirror is rotatable about an axis substantially parallel to the predefined pathway.

27. The radiation source module defined in claim 23, wherein the radiation collector comprises a movable window for receiving the first portion of radiation from the predefined arc and a reflector for redirecting the first portion of radiation from the predefined arc along a predefined pathway to the sensor element.

28. The radiation source module defined in claim 27, wherein the reflector is fixed with respect to movement of the window.

29. The radiation source module defined in claim 27, wherein the reflector is movable with respect to the window.

30. The radiation source module defined in claim 27, wherein the reflector comprises a distal surface having a generally concave shape and further comprises a reflective surface to reflect the radiation from the window along the predefined pathway.

31. The radiation source module defined in claim 27, wherein the radiation collector comprises a distal surface having a generally convex shape which refracts and reflects the incident radiation along the pathway.

32. The radiation source module defined in claim 18, wherein the radiation collector and the sensor element are comprised in a integral unit which is rotatably moveable by the motive means.

33. The radiation source module defined in claim 18, wherein the motive means moves the radiation collector in a step-wise manner from the first position to the second position.

34. The radiation source module defined in claim 18, wherein the motive means moves the radiation collector in a continuous manner between the first position and the second position.

35. A method for measuring transmittance of a fluid being exposed to a radiation field having disposed therein an optical radiation sensor device, the fluid and the radiation field being within a water treatment system, the device having: (i) a radiation collector within the water treatment system, for receiving radiation from a predefined arc around the dollector within the radiation field; (ii) the radiation collector being movable from a first position within the water treatment system in which a first portion of the predefined arc is received by the radiation collector and a second position within the water treatment system in which a second portion of the predefined arc is received by the radiation collector; and (iii) a sensor element within the water treatment system and capable of detecting and responding to incident radiation received from the radiation collector when the radiation collector is in the first position and in the second position, the method comprising the steps of:

(i) determining a first radiation intensity at the first position of the radiation collector within the water treatment system;

(ii) producing a first output from the sensor element which correlates to the first radiation intensity;

(iii) moving the radiation collector to the second position within the water treatment system;

(iv) determining a second radiation intensity at the second position of the radiation collector;

(v) producing a second output from the sensor element which correlates to the second radiation intensity; and (vi) calculating the transmittance of the fluid from the first output and the second output.

* * * * *